United States Patent
Lee et al.

(10) Patent No.: US 11,758,032 B2
(45) Date of Patent: Sep. 12, 2023

(54) ELECTRONIC DEVICE COMPRISING HAPTIC ACTUATOR

(71) Applicant: SAMSUNG ELECTRONICS CO., LTD., Suwon-si (KR)

(72) Inventors: Soogyu Lee, Suwon-si (KR); Minsoo Kim, Suwon-si (KR); Ryounghun Kim, Suwon-si (KR); Sanghyeon Kim, Suwon-si (KR); Yunjae Jun, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/654,423

(22) Filed: Mar. 11, 2022

(65) Prior Publication Data

US 2022/0201105 A1  Jun. 23, 2022

Related U.S. Application Data

(63) Continuation of application No. PCT/KR2020/012656, filed on Sep. 18, 2020.

(30) Foreign Application Priority Data

Sep. 30, 2019 (KR) .................. 10-2019-0120832

(51) Int. Cl.
 *H04M 1/02* (2006.01)
 *H04M 1/72484* (2021.01)
(52) U.S. Cl.
 CPC ....... *H04M 1/0218* (2013.01); *H04M 1/0268* (2013.01); *H04M 1/72484* (2021.01)

(58) Field of Classification Search
 CPC .... G06F 1/1652; G06F 1/1681; G06F 1/1616; G06F 1/1641; G06F 3/04883;
 (Continued)

(56) References Cited

U.S. PATENT DOCUMENTS 9,851,797 B1  12/2017  Soini et al.
2015/0233162 A1  8/2015  Lee et al.
(Continued)

FOREIGN PATENT DOCUMENTS

KR  10-2015-0096827 A  8/2015
KR  10-2017-0034340 A  3/2017
(Continued)

OTHER PUBLICATIONS

International Search Report and Written Opinion of the International Searching Authority in connection with International Application No. PCT/KR2020/012656 dated Dec. 15, 2020, 13 pages.

*Primary Examiner* — Golam Sorowar

(57) ABSTRACT

An electronic device according to various embodiments of the disclosure may include a first housing structure, a second housing structure arranged adjacent to the first housing structure, a hinge structure arranged between the first housing structure and the second housing structure and providing a rotational movement between the first housing structure and the second housing structure, a flexible display extending from the first housing structure to the second housing structure, across the hinge structure, and at least one haptic actuator arranged in the hinge structure or adjacent to the hinge structure. The at least one haptic actuator may be arranged in parallel with the folding axis direction of the hinge structure so as to output vibrations corresponding to the folding axis.

13 Claims, 14 Drawing Sheets

(58) Field of Classification Search
CPC ......... G06F 3/0487; G06F 2203/04102; G06F 3/016; G06F 1/1626; G06F 1/1643; G06F 2203/04803; G06F 3/0412; G06F 3/0488; G06F 1/1677; G06F 1/1656; G06F 1/1679; G06F 3/017; G06F 3/0416; G06F 1/1624; G06F 1/163; G06F 1/1686; G06F 2203/04104; G06F 3/045; G06F 3/04817; G06F 3/0483; G06F 3/04845; G06F 1/1658; G06F 2203/04804; G06F 3/041; G06F 3/04847; G06F 1/1683; G06F 21/32; G06F 2203/04806; G06F 3/044; G06F 3/04886; H04M 1/0268; H04M 1/0216; H04M 1/0214; H04M 1/0237; H04M 2250/22; H04M 1/02; H04M 2250/16; H04M 1/022; H04M 1/0245; H04M 1/0247; H04M 1/0249; H04M 1/0264; H04M 1/0266; H04M 1/0262; H04M 1/724; H04M 1/72403; H04M 1/72436; H04M 2201/38; H04M 1/0202; H04M 1/0206; H04M 1/0227; H04M 1/0231; H04M 1/0233; H04M 1/0235; H04M 1/185; H04M 1/236; H04M 1/667; H04M 1/72469; H04M 2250/52; H04M 1/026

See application file for complete search history.

(56) References Cited

U.S. PATENT DOCUMENTS

| | | | |
|---|---|---|---|
| 2017/0083092 A1* | 3/2017 | Levesque | G06F 3/0346 |
| 2018/0224941 A1* | 8/2018 | Modarres | G06F 3/0488 |
| 2019/0391680 A1 | 12/2019 | Jung et al. | |
| 2020/0218353 A1 | 7/2020 | Song et al. | |
| 2020/0233466 A1* | 7/2020 | Sanchez | H05K 5/0017 |
| 2020/0293093 A1 | 9/2020 | Kim et al. | |

FOREIGN PATENT DOCUMENTS

| | | |
|---|---|---|
| KR | 10-2017-0089831 A | 8/2017 |
| KR | 10-2020-0085174 A | 7/2020 |
| KR | 10-2020-0109737 A | 9/2020 |

\* cited by examiner

ELECTRONIC DEVICE COMPRISING HAPTIC ACTUATOR

CROSS-REFERENCE TO RELATED APPLICATIONS

This application is a bypass continuation of International Application No. PCT/KR2020/012656 filed Sep. 18, 2020, which claims priority to Korean Patent Application No. 10-2019-0120832, filed Sep. 30, 2019, the disclosures of which are herein incorporated by reference in their entirety.

FIELD

Various embodiments of the disclosure relate to an electronic device including a haptic actuator.

DESCRIPTION OF RELATED ART

Due to the remarkable development of information communication technology, semiconductor technology, and the like, the distribution and use of various electronic devices are rapidly increasing. In particular, recent electronic devices are being developed such that users are capable of communicating with each other while carrying the electronic devices.

An electronic device refers to a device that performs a specific function according to a program equipped therein, such as an electronic scheduler, a portable multimedia player, a mobile communication terminal, a tablet PC, an image/sound device, a desktop/laptop PC, or a vehicle navigation system, as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproducing function), a communication and security function for mobile banking or the like, a schedule management function, and an e-wallet function, in addition to a communication function, have come to be integrated in a single electronic device. Such an electronic device is being miniaturized so that a user can conveniently carry the electronic device.

As the mobile communication service is extended to the multimedia service area, the sizes of the displays of electronic devices may be increased so as to allow the users to fully utilize the multimedia service as well as a voice call or short message service. Thus, a foldable display may be placed over the entire area of housing structures, which is separated to be foldable.

SUMMARY

In general, an electronic device that can be folded (hereinafter, a foldable electronic device) includes a plurality of housing structures, which are rotatable relative to each other by a hinge structure. In a foldable electronic device, a haptic actuator generating vibrations having an amplitude in the Z-axis direction (the direction perpendicular to the display) may be arranged in one housing structure.

The haptic actuator may generate a vibration force deviation for each location of the electronic device. For example, a vibration generated by the haptic actuator is attenuated as it passes through a hinge structure, and as a result, a vibration deviation for each location may occur between the housing structures.

In addition, when physical deformation occurs due to rotation between housing structures in the foldable electronic device, vibrations of a haptic actuator mounted in only one housing structure is subjected to interference due to the other housing structure. Thus, it may be difficult to transfer effective haptic feedback to the entire surface of the display. For example, the overall thickness of the foldable electronic device may vary as the shape thereof changes in the Z-axis direction (varying between a mobile mode (at the time of being folded) and a tablet mode (at the time of being unfolded)). Accordingly, when a haptic actuator having an amplitude of vibration in the Z-axis direction is located at one side of one of the plurality of housing structures, the haptic actuator may not transfer an effective amplitude to each housing structure.

According to various embodiments of the disclosure, a haptic actuator may be arranged inside or adjacent to a hinge structure arranged in a foldable electronic device.

According to various embodiments of the disclosure, in a foldable electronic device, a haptic actuator is arranged in parallel with the folding axis of a hinge structure and is configured to provide a vibration corresponding to the folding axis, so that it is possible to prevent a damping effect due to the hinge structure and to provide an improved haptic feedback to a user irrespective of physical deformation between the housing structures.

An electronic device according to various embodiments of the disclosure may include a first housing structure, a second housing structure arranged adjacent to the first housing structure, a hinge structure arranged between the first housing structure and the second housing structure and configured to provide a rotational movement between the first housing structure and the second housing structure, a flexible display extending from the first housing structure across the hinge structure to the second housing structure, and at least one haptic actuator arranged inside or adjacent to the hinge structure. The at least one haptic actuator may be arranged in parallel with a direction for a folding axis of the hinge structure so as to output vibrations corresponding to the folding axis.

An electronic device according to various embodiments of the disclosure may include a first housing structure, a second housing structure arranged adjacent to the first housing structure, a hinge structure arranged between the first housing structure and the second housing structure and configured to provide a rotational movement between the first housing structure and the second housing structure, and at least one haptic actuator arranged inside the hinge structure. The at least one haptic actuator may be arranged in parallel with a direction for a folding axis direction of the hinge structure so as to output an amplitude parallel with the folding axis.

In a foldable electronic device according to various embodiments of the disclosure, it is possible to arrange a haptic actuator inside or adjacent to the hinge structure. In addition, it is possible to arrange the haptic actuator in parallel with the folding axis of the hinge structure and to provide a vibration corresponding to the folding axis. Accordingly, it is possible to provide an improved haptic feedback to the entire area of the foldable electronic device.

DETAILED DESCRIPTION

Figure 1:
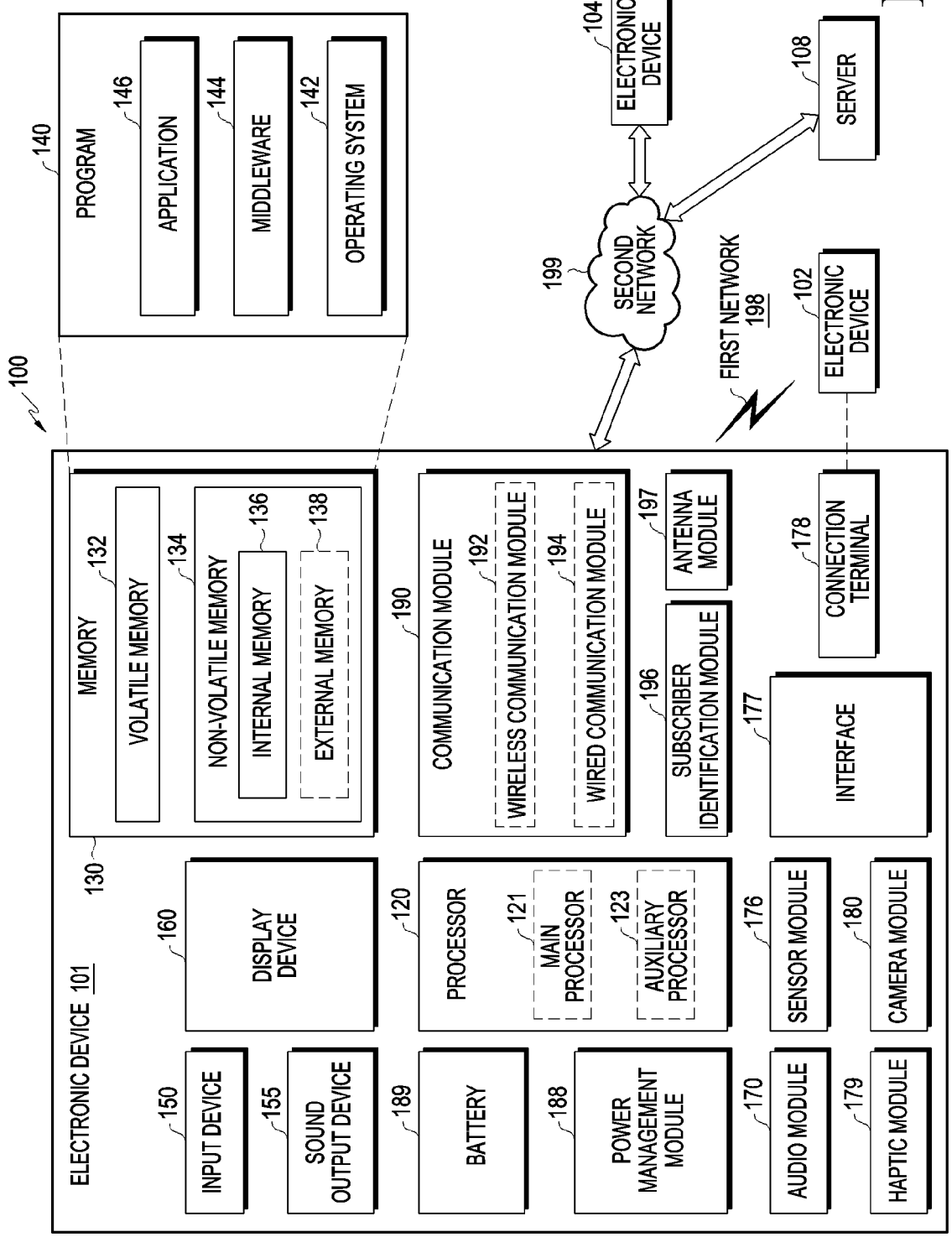
FIG. 1 is a block diagram of an electronic device according to various embodiments in a network environment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
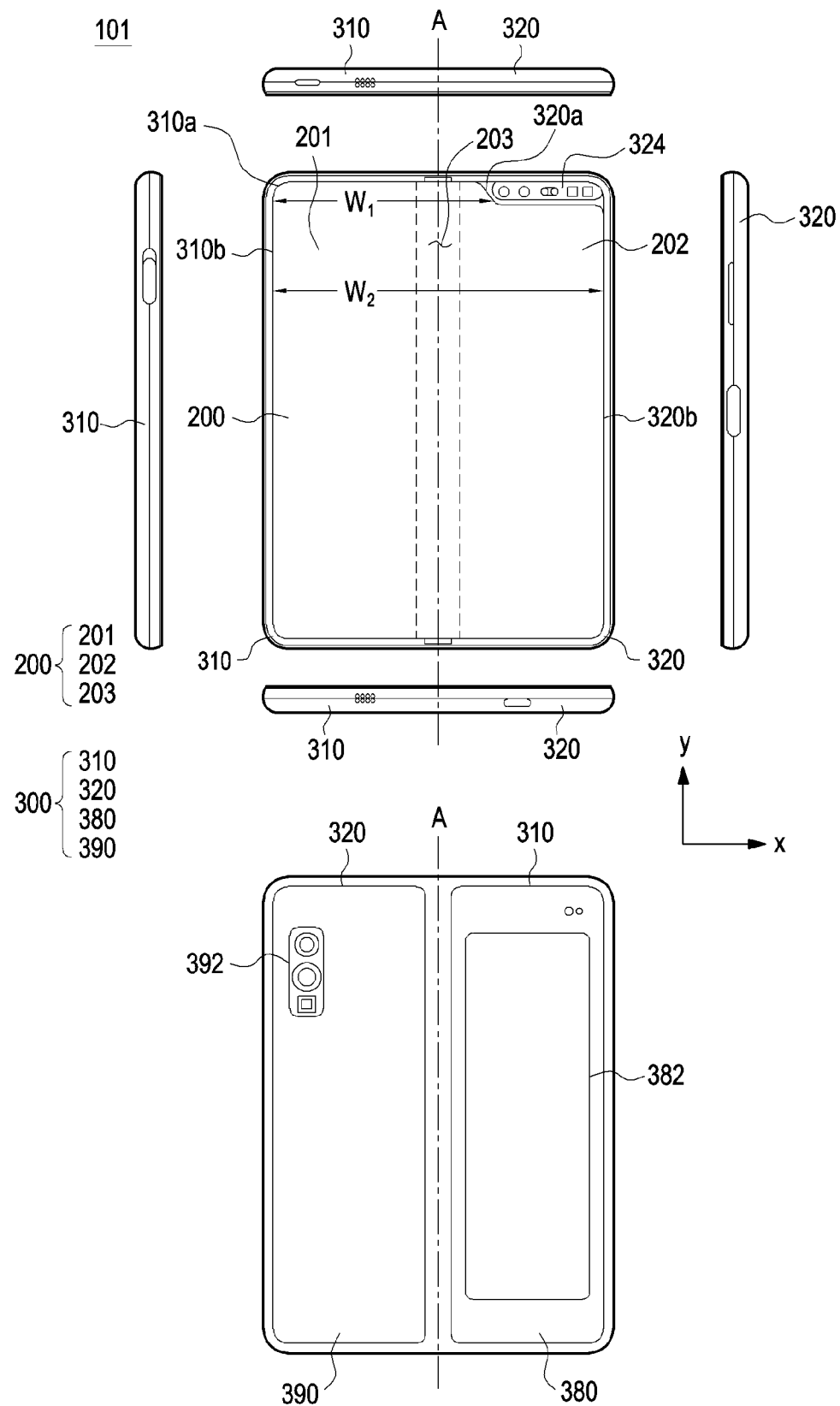
FIG. 2 is a view illustrating a state in which a foldable electronic device is unfolded according to various embodiments of the disclosure.
Figure 3:
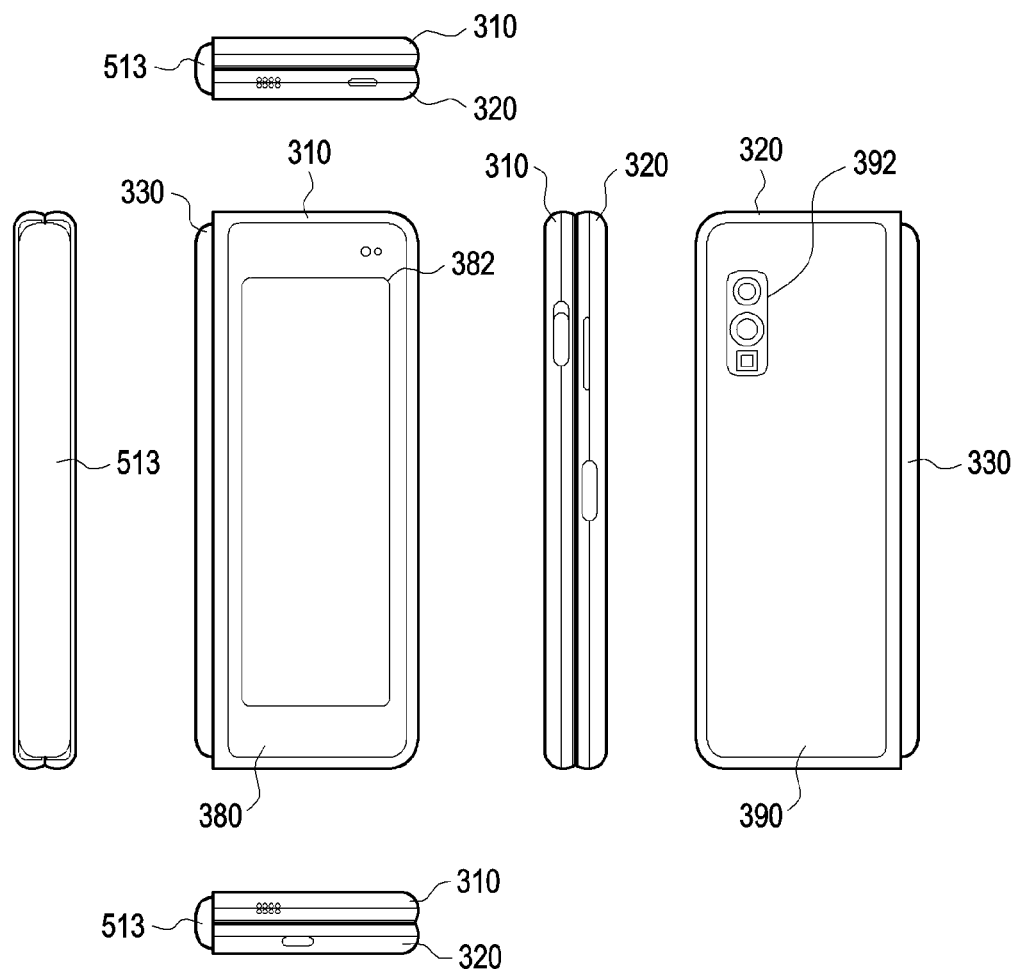
FIG. 3 is a view illustrating a state in which the foldable electronic device is folded according to various embodiments of the disclosure.

FIG. 2 is a view illustrating a state in which a foldable electronic device is unfolded according to various embodiments of the disclosure. FIG. 3 is a view illustrating a state in which the foldable electronic device is folded according to various embodiments of the disclosure.

Referring to FIGS. 2 and 3, in certain embodiment, a foldable electronic device (hereinafter, an electronic device 101) may include a foldable housing 300, a hinge case (e.g., the hinge case 513 in FIG. 3) configured to cover the foldable portion of the foldable housing 300, and a flexible or foldable display 200 (hereinafter, simply referred to as a "display" 200) (e.g., the display device 160 in FIG. 1) disposed in the space defined by the foldable housing 300. According to certain embodiments, the surface on which the display 200 is arranged is defined as the front surface of the electronic device 101. The surface opposite to the front surface is defined as the rear surface of the electronic device 101. In addition, the surface surrounding the space between the front surface and the rear surface is defined as the side surface of the electronic device 101.

Figure 4:
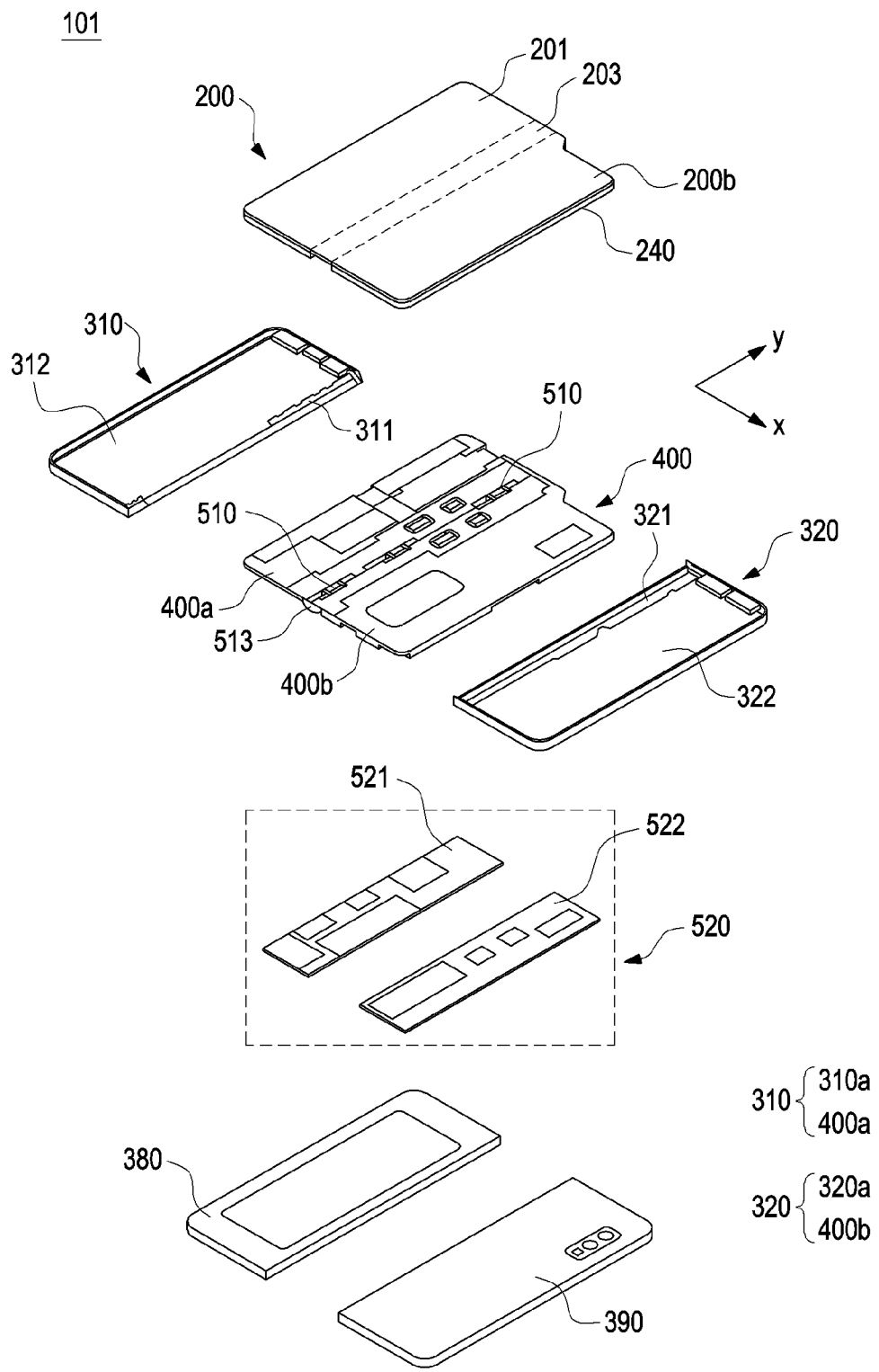
FIG. 4 is an exploded perspective view illustrating the foldable electronic device according to various embodiments of the disclosure.

According to various embodiments, the foldable housing 300 may include a first housing structure 310, a second housing structure 320 including a sensor area 324, a first rear cover 380, a second rear cover 390, and a hinge structure (e.g., a hinge structure 510 in FIG. 4). The foldable housing 300 of the electronic device 101 is not limited to the shape and assembly illustrated in FIGS. 2 and 3 but may be implemented by a combination and/or an assembly of different shapes or components. For example, in another embodiment, the first housing structure 310 and the first rear cover 380 may be integrally configured, and the second housing structure 320 and the second rear cover 390 may be integrally configured.

According to various embodiments, the first housing structure 310 may be connected to a hinge structure (e.g., the hinge structure 510 in FIG. 4), and may include a first surface oriented in a first direction and a second surface oriented in a second direction opposite the first direction. The second housing structure 320 may be connected to the hinge structure 510 and may include a third surface oriented in a third direction and a fourth surface oriented in a fourth direction opposite the third direction. The second housing structure 320 is rotatable about the hinge structure 510 relative to the first housing structure 310. Accordingly, the electronic device 101 may be deformable into the folded state or the unfolded state. In the folded state of the electronic device 101, the first surface may face the third surface, and in the unfolded state, the third direction may be the same as the first direction.

According to various embodiments, the first housing structure 310 and the second housing structure 320 may be disposed on opposite sides about the folding axis A, and may have a generally symmetrical shape with respect to the folding axis A. As will be described later, the first housing structure 310 and the second housing structure 320 may have different angles or distances therebetween depending on whether the electronic device 101 is in the unfolded state, in the folded state, or in the intermediate state. According to certain embodiments, unlike the first housing structure 310, the second housing structure 320 may further include the sensor area 324 in which various sensors are disposed. However, the first housing structure 310 and the second housing structure 320 may have mutually symmetrical shapes in other areas.

According to various embodiments, as illustrated in FIG. 2, the first housing structure 310 and the second housing structure 320 may form a recess that accommodates the display 200 therein. According to certain embodiments, due to the sensor area 324, the recess may have two or more different widths in a direction perpendicular to the folding axis A.

According to certain embodiments, the recess may have a first width w1 between a first portion 310a parallel to the folding axis A of the first housing structure 310 and a first portion 320a provided at the periphery of the sensor area 324 of the second housing structure 320. The recess may have a second width w2 defined by a second portion 310b of the first housing structure 310 and a second portion 320b of the second housing structure 320, which is parallel to the folding axis A while not corresponding to the sensor area 324. In this case, the second width W2 may be greater than the first width W1. As another example, the first portion 310a of the first housing structure 310 and the first portion 320a of the second housing structure 320, which are asymmetric to each other, may define the first width W1 of the recess, and the second portion 310b of the first housing structure 310 and the second portion 320b of the second housing structure 320, which are symmetric to each other, may define the second width W2 of the recess. According to certain embodiments, the first portion 320a and the second portion 320b of the second housing structure 320 may have different distances from the folding axis A, respectively. The width of the recess is not limited to the illustrated example. In another embodiment, the recess may have multiple widths due to the shape of the sensor area 324 or due to the asymmetric portions of the first housing structure 310 and the second housing structure 320.

According to various embodiments, at least a portion of the first housing structure 310 and at least a portion of the second housing structure 320 may be formed of a metal material or a non-metallic material having the rigidity of a level selected to support the display 200. The at least a portion formed of the metal material may provide a ground plane of the electronic device 101 and may be electrically connected to a ground line provided on a printed circuit board (e.g., the board unit 520 in FIG. 4).

According to various embodiments, the sensor area 324 may be provided to have a predetermined area adjacent to one corner of the second housing structure 320. However, the arrangement, shape, and size of the sensor area 324 are not limited to the illustrated example. For example, in certain embodiments, the sensor area 324 may be provided at another corner of the second housing structure 320 or in any area between the upper and lower end corners. In certain embodiments, components embedded in the electronic device 101 to perform various functions may be exposed to the front surface of the electronic device 101 through the sensor area 324 or one or more openings provided in the sensor area 324. In various embodiments, the components may include various types of sensors. The sensors may include at least one of, for example, a front camera, a receiver, or a proximity sensor.

According to various embodiments, the first rear cover 380 may be arranged on one side of the folding axis in the rear surface of the electronic device 101, and may have, for example, a substantially rectangular periphery, which may be enclosed by the first housing structure 310. Similarly, the second rear cover 390 may be arranged on the other side of the folding axis of the rear surface of the electronic device 101, and the periphery of the second rear cover 390 may be enclosed by the second housing structure 320.

According to various embodiments, the first rear cover 380 and the second rear cover 390 may have substantially symmetrical shapes about the folding axis (the axis A). However, the first rear cover 380 and the second rear cover 390 do not necessarily have mutually symmetrical shapes, and in another embodiment, the electronic device 101 may include a first rear cover 380 and a second rear cover 390 having various shapes. In still another embodiment, the first rear cover 380 may be configured integrally with the first housing structure 310, and the second rear cover 390 may be configured integrally with the second housing structure 320.

According to various embodiments, the first rear cover 380, the second rear cover 390, the first housing structure 310, and the second housing structure 320 may define a space in which various components (e.g., a printed circuit board, or a battery) may be arranged. According to certain embodiments, one or more components may be arranged or visually exposed on the rear surface of the electronic device 101. For example, at least a portion of a sub-display may be visually exposed through a first rear area 382 of the first rear cover 380. In another embodiment, one or more components or sensors may be visually exposed through a second rear area 392 of the second rear cover 390. In various embodiments, the sensors may include a proximity sensor and/or a rear camera.

According to various embodiments, a front camera exposed to the front surface of the electronic device 101 through the one or more openings provided in the sensor area 324 or a rear camera exposed through the second rear area 392 of the second rear cover 390 may include one or more lenses, an image sensor, and/or an image signal processor. The flash may include, for example, a light-emitting diode or a xenon lamp. In some embodiments, two or more lenses (e.g., an infrared camera, a wide-angle lens, and a telephoto lens), and image sensors may be arranged on one surface of the electronic device 101.

Referring to FIG. 3, the hinge case 513 may be arranged between the first housing structure 310 and the second housing structure 320 so as to cover internal components (e.g., the hinge structure 510 in FIG. 4). According to certain embodiments, the hinge case 513 may be covered by a portion of the first housing structure 310 and a portion of the second housing structure 320 or may be exposed to the outside depending on the state of the electronic device 101 (the unfolded state, the intermediate state, or the folded state).

According to certain embodiments, as illustrated in FIG. 2, when the electronic device 101 is in the unfolded state, the hinge case 513 may be covered by the first housing structure 310 and the second housing structure 320 so as not to be exposed. As another example, as illustrated in FIG. 3, when the electronic device 101 is in the folded state (e.g., the fully folded state), the hinge case 513 may be exposed to the outside between the first housing structure 310 and the second housing structure 320. As still another example, when the first housing structure 310 and the second housing structure 320 are in the intermediate state in which the first housing structure 310 and the second housing structure 320 are folded to form a predetermined angle therebetween, a portion of the hinge case 513 may be exposed to the outside between the first housing structure 310 and the second housing structure 320. In this case, however, the exposed area may be smaller than that in the fully folded state. In certain embodiments, the hinge case 513 may include a curved surface.

According to various embodiments, the display 200 may be arranged in a space defined by the foldable housing 300. For example, the display 200 may be seated in the recess defined by the foldable housing 300 and may constitute most of the front surface of the electronic device 101. Accordingly, the front surface of the electronic device 101 may include the display 200, and partial areas of the first housing structure 310 and the second housing structure 320, which are adjacent to the display 200. In addition, the rear surface of the electronic device 101 may include the first rear cover 380, a partial area of the first housing structure 310 adjacent to the first rear cover 380, the second rear cover 390, and a partial area of the second housing structure 320 adjacent to the second rear cover 390.

According to various embodiments, the display 200 may refer to a display in which at least a portion is deformable into a planar surface or a curved surface. According to certain embodiments, the display 200 may include a folding area 203, a first area 201 arranged at one side of the folding area 203 (e.g., the left side of the folding area 203 illustrated in FIG. 2), and a second area 202 arranged at the other side of the folding area 203 (e.g., the right side of the folding area 203 illustrated in FIG. 2).

However, the area division of the display 200 illustrated in FIG. 2 is illustrative, and the display 200 may be divided into multiple areas (e.g., four or more or two areas) depending on the structure or function thereof. For example, in the embodiment illustrated in FIG. 2, the area of the display 200 may be divided by the folding area 203 or the folding axis (the axis A) extending parallel to the y axis. However, in another embodiment, the area of the display 200 may be divided based on another folding area (e.g., a folding area parallel to the x axis) or another folding axis (e.g., a folding axis parallel to the x axis). According to certain embodiments, the display 200 may be coupled to or arranged adjacent to a touch-sensing circuit, a pressure sensor that is capable of measuring touch intensity (pressure), and/or a digitizer that detects a magnetic field-type stylus pen.

According to various embodiments, the first area 201 and the second area 202 may have generally symmetrical shapes about the folding area 203. However, unlike the first area 201, the second area 202 may include a notch cut due to the presence of the sensor area 324 but may have a shape symmetrical to the first area 201 in areas other than the sensor area. In other words, the first area 201 and the second area 202 may include portions having mutually symmetrical shapes and portions having mutually asymmetrical shapes.

Hereinafter, the operations of the first housing structure 310 and the second housing structure 320 according to the state of the electronic device 101 (e.g., the unfolded state, the folded state, or the intermediate state) and respective areas of the display 200 will be described.

According to various embodiments, when the electronic device 101 is in the unfolded state (e.g., FIG. 2), the first housing structure 310 and the second housing structure 320 may be arranged to form an angle of 180 degrees therebetween and to be oriented in the same direction. The surface of the first area 201 and the surface of the second area 202 of the display 200 may form 180 degrees relative to each other and may face the same direction (e.g., the front direction of the electronic device). The folding area 203 may form the same plane as the first area 201 and the second area 202.

According to various embodiments, when the electronic device 101 is in the folded state (e.g., FIG. 3), the first housing structure 310 and the second housing structure 320 may be arranged to face each other. The surface of the first area 201 and the surface of the second area 202 of the display 200 may face each other while forming a narrow angle (e.g., an angle between 0 degrees and 10 degrees) relative to each other. At least a portion of the folding area 203 may be formed as a curved surface having a predetermined curvature.

According to various embodiments, when the electronic device 101 is in the intermediate state, the first housing structure 310 and the second housing structure 320 may be arranged to form a predetermined angle relative to each other. The surface of the first area 201 and the surface of the second area 202 of the display 200 may form an angle greater than that in the folded state and smaller than that in the unfolded state. At least a portion of the folding area 203 may have a curved surface having a predetermined curvature, and the curvature at this time may be smaller than that in the folded state.

FIG. 4 is an exploded perspective view illustrating the foldable electronic device according to various embodiments of the disclosure.

Referring to FIG. 4, in various embodiments, the foldable electronic device (hereinafter, an electronic device 101) may include a foldable housing, a flexible display (hereinafter, a display 200), and a board unit 520. The foldable housing may include a first housing structure 310, a second housing structure 320, a first rear cover 380, a second rear cover 390, a bracket assembly 400, and a hinge structure 510. The first housing structure 310 may include a first housing 312 and a first partial area of the bracket assembly 400 (e.g., the first bracket 400a), and the second housing structure 320 may include a second housing 322 and a second partial area of the bracket assembly 400 (e.g., the second bracket 400b).

According to various embodiments, the display 200 may include a display panel 200b (e.g., a flexible display panel), and at least one plate or layer (e.g., the support plate 240) on which the display panel 200 is seated. In certain embodiments, the support plate 240 may be arranged between the display panel 200b and the bracket assembly 400. An adhesive structure may be located between the support plate 240 and the bracket assembly 400 and may bond the support plate 240 to the bracket assembly 400.

According to various embodiments, the bracket assembly 400 may include a first bracket 400a and a second bracket 400b, and a hinge structure 510 may be arranged between the first bracket 400a and the second bracket 400b. The hinge structure 510 may include a hinge case 513 to cover hinges arranged therein. As another example, a printed circuit board (e.g., a flexible printed circuit (FPC)) may be arranged across the first bracket 400a and the second bracket 400b.

According to various embodiments, the board unit 520 may include a first main circuit board 521 disposed on the first bracket 400a side and a second main circuit board 522 disposed on the second bracket 400b side. The first main circuit board 521 and the second main circuit board 522 may be arranged inside a space defined by the bracket assembly 400, the first housing structure 310, the second housing structure 320, the first rear cover 380, and the second rear cover 390. Components for implementing various functions of the electronic device 101 may be mounted on the first main circuit board 521 and the second main circuit board 522.

According to various embodiments, the first housing 312 and the second housing 322 may be assembled so as to be coupled to the opposite sides of the bracket assembly 400 in the state in which the display 200 is coupled to the bracket assembly 400. For example, the first housing 312 may be coupled by being slid from one side of the first bracket 400a, and the second housing 322 may be coupled by being slid from one side of the second bracket 400b.

According to certain embodiments, the first housing structure 310 may include a first rotation support surface 311 arranged at one end of the first housing 312, and the second housing structure 320 may include a second rotation support surface 321 arranged at one end of the second housing 322 and corresponding to the first rotation support surface 311. The first rotation support surface 311 and the second rotation support surface 321 may include curved surfaces corresponding to the curved surfaces included in the hinge case 513, respectively.

According to certain embodiments, when the electronic device 101 is in the unfolded state (e.g., the electronic device in FIG. 2), the first rotation support surface 311 and the second rotation support surface 321 may cover the hinge case 513 so that the hinge case 513 may not be exposed to the rear surface of the electronic device 101 or may be exposed to the rear surface of the electronic device 101 to a minimum. As still another example, when the electronic device 101 is in the folded state (e.g., the electronic device in FIG. 3), the first rotation support surface 311 and the second rotation support surface 321 may rotate along the curved surfaces included in the hinge case 513 so that the hinge case 513 can be exposed to the rear surface of the electronic device 101 as much as possible.

Figure 5A:
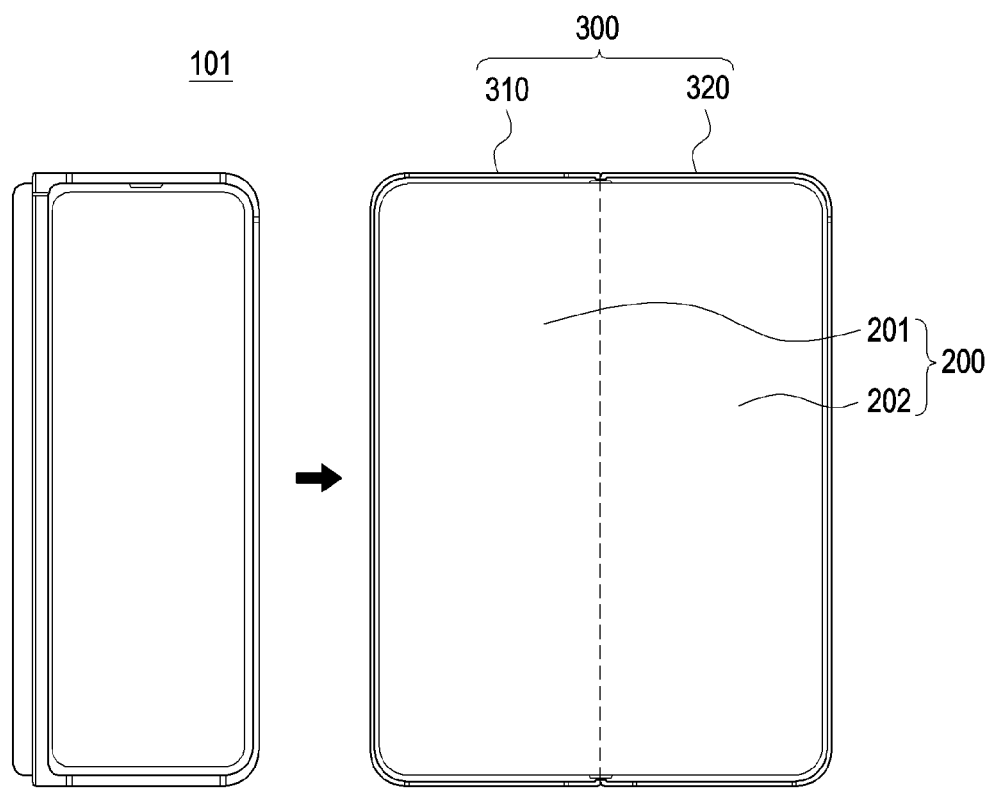
FIGS. 5A and 5B each illustrate an example of a folded state or an unfolded state of the foldable electronic device according to various embodiments of the disclosure.
Figure 5B:
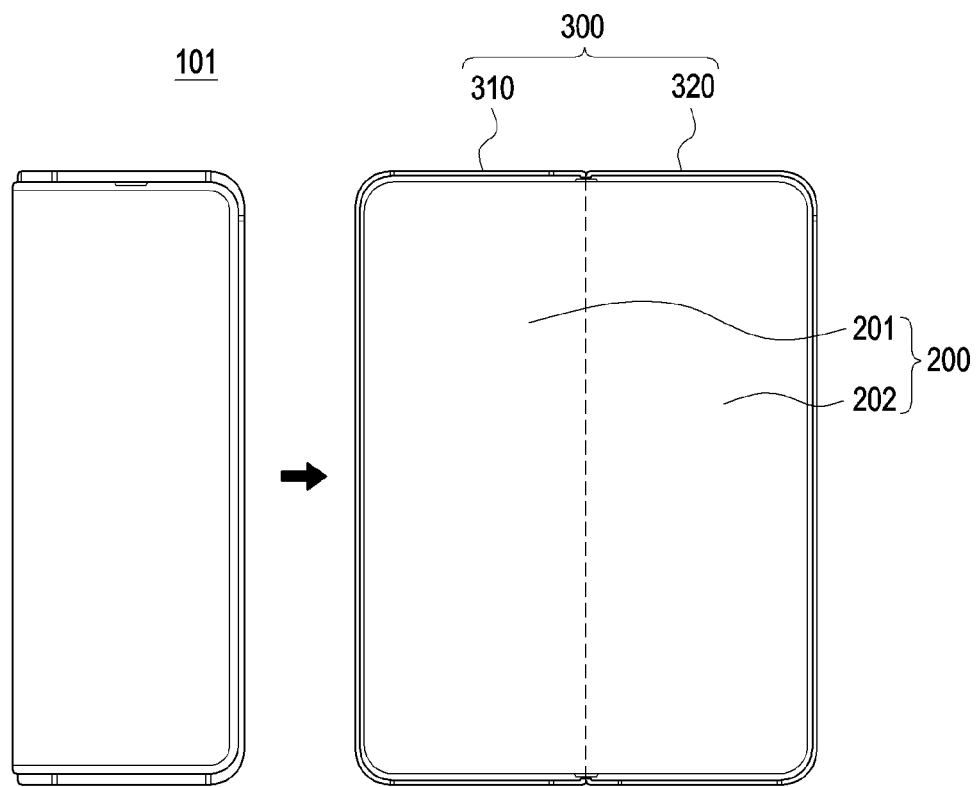

FIGS. 5A and 5B each illustrate an example of a folded state or an unfolded state of the foldable electronic device according to various embodiments of the disclosure.

Referring to FIGS. 5A and 5B, the foldable electronic device (hereinafter, an electronic device 101) may include a foldable housing 300 and a flexible display 200. The foldable housing 300 may include a first housing structure 310 and a second housing structure 320 that perform a rotational movement relative to each other by a hinge assembly. The flexible display 200 may be arranged to extend from the first housing structure 310 to the second housing structure 320 and may form a curved surface corresponding to the folded or unfolded state of the electronic device 101. The flexible display 200 may include a front surface facing the outside of the electronic device 101 and a rear surface facing the inside of the electronic device 101.

According to various embodiments, the electronic device 101 may include an in-folding type (e.g., FIG. 5A) or an out-folding type (e.g., FIG. 5B). The in-folding type may refer to a state in which the flexible display 200 is not exposed to the outside in the fully folded state. As another example, the in-folding type may refer to a state in which the flexible display 200 is folded forward. The out-folding type may refer to a state in which the flexible display 200 is exposed to the outside in the fully folded state. As still another example, the out-folding type may refer to a state in which the flexible display 200 is folded rearward.

According to various embodiments, the electronic device 101 may be a multi-foldable device configured in an in-out-folding type. As still another example, the flexible display 200 may have a rectangular shape with rounded corners and may take a form having a narrow bezel area. The flexible display 200 may include a first area 201 arranged in the first housing structure 310 and a second area 202 arranged in the second housing structure 320, and the first area 201 and the second area 202 may be implemented in the same shape.

The descriptions of the components of the electronic device 101 of FIGS. 1 to 4 may be applicable to the components of the electronic device 101 of FIGS. 5A and 5B.

Figure 6A:
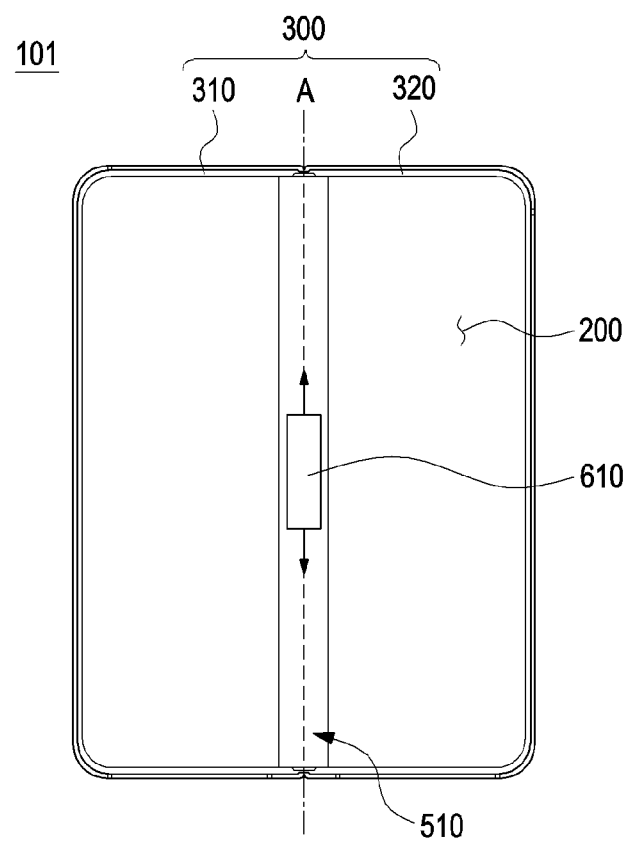
FIG. 6A is a schematic view illustrating a position at which a haptic actuator is mounted in the unfolded state of the foldable electronic device according to various embodiments of the disclosure.

FIG. 6A is a schematic view illustrating a position at which a haptic actuator is mounted in the unfolded state of the foldable electronic device According to various embodiments of the disclosure.

Figure 6B:
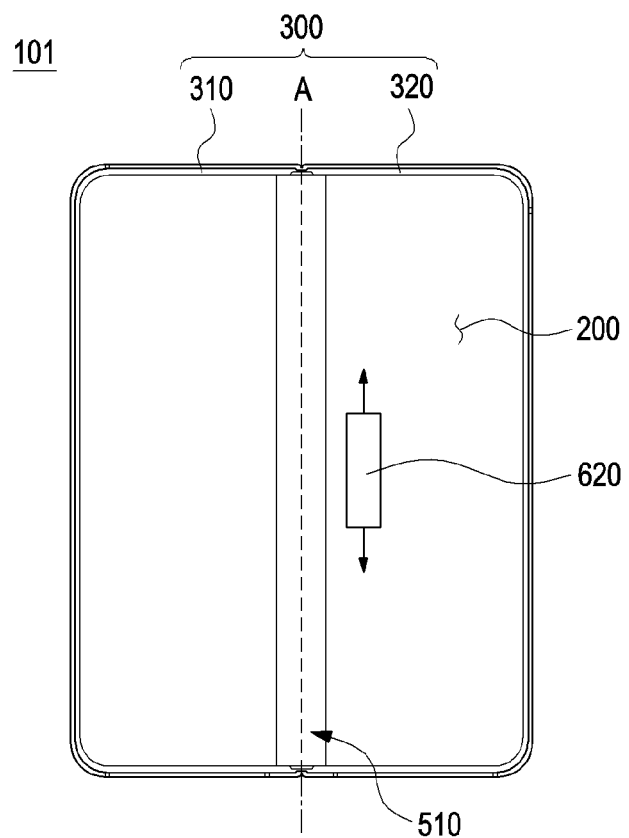
FIG. 6B is a schematic view illustrating a position at which a haptic actuator is mounted in the unfolded state of the foldable electronic device according to various embodiments of the disclosure.

FIG. 6B is a schematic view illustrating a position at which a haptic actuator is mounted in the unfolded state of the foldable electronic device according to various embodiments of the disclosure.

According to various embodiments, the foldable electronic device (hereinafter, an electronic device 101) may include a foldable housing 300, a flexible display 200, a hinge structure 510, and a haptic actuator 610 or 620. Some or all of the configurations of the foldable housing 300, the flexible display 200, and the hinge structure 510 of FIGS. 6A and 6B may be the same as those of the first housing structure 310, the second housing structure 320, the display 200, and the hinge structure 510 of FIGS. 2 to 5B.

According to various embodiments, the foldable housing 300 may include a hinge structure 510, a first housing structure 310, and a second housing structure 320. The foldable housing 300 may be configured such that the second housing structure 320 is rotatable relative to the first housing structure 310. Depending on the rotation operation, a folded state in which the first housing structure 310 and the second housing structure 320 face each other, an unfolded state in which the first housing structure 310 and the second housing structure 320 are disposed parallel to each other, or an intermediate status maintaining a predetermined angle may be provided. FIGS. 6A and 6B illustrate the unfolded state (e.g., a flat state).

According to various embodiments, the at least one haptic actuator 610 or 620 may be arranged inside a hinge structure 510 or inside a first housing structure 310 or a second housing structure 320 adjacent to the hinge structure 510. For example, the haptic actuator 610 or 620 may output sound or vibrations in response to various types of inputs, such as a user touch input, to provide feedbacks corresponding to inputs to the user. As another example, the haptic actuator 610 or 620 may generate a vibration force through a linear reciprocating motion with reference to a specific axis (e.g., the folding axis A).

Referring to FIG. 6A, the at least one haptic actuator 610 may be located inside the hinge structure 510. For example, the haptic actuator 610 may be arranged inside the hinge structure 510 in parallel with the folding axis A direction of the hinge structure 510 and may output vibrations corresponding to the folding axis A. As another example, the haptic actuator 610 may generate a linear vibrational movement in the longitudinal direction. The traveling direction of the vibrations generated by the haptic actuator 610 may be a direction toward the first housing structure 310 and/or the second housing structure 320 disposed on opposite sides, and the amplitude of the vibrations generated by the haptic actuator 610 may be perpendicular to the traveling direction and parallel to the folding axis A.

Referring to FIG. 6B, the at least one haptic actuator 620 may be located adjacent to the hinge structure 510. For example, the haptic actuator 620 may be mounted inside the first housing structure 310 or the second housing structure 320, may be arranged in parallel with the folding axis A direction of the hinge structure 510, and may output vibrations corresponding to the folding axis A. As another example, the haptic actuator 620 may generate a linear vibrational movement in the longitudinal direction. The traveling direction of the vibrations generated by the haptic actuator 620 may be a direction toward the first housing structure 310 and/or the second housing structure 320 disposed on opposite sides, and the amplitude of the vibrations generated by the haptic actuator 620 may be perpendicular to the traveling direction and parallel to the folding axis A.

Figure 7:
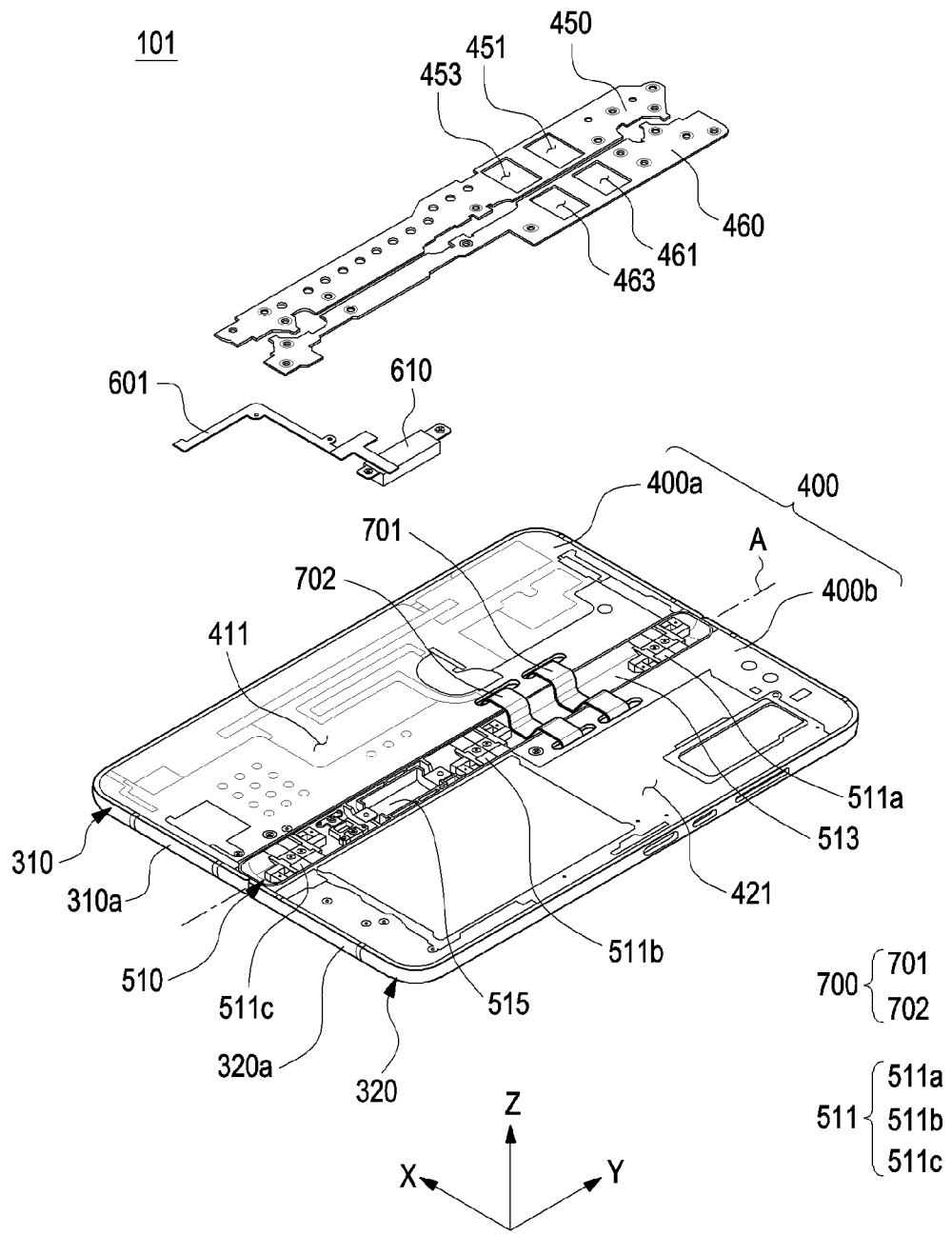
FIG. 7 is an exploded perspective view illustrating an arrangement relationship of a haptic actuator and peripheral components thereof, according to various embodiments of the disclosure.
Figure 8:
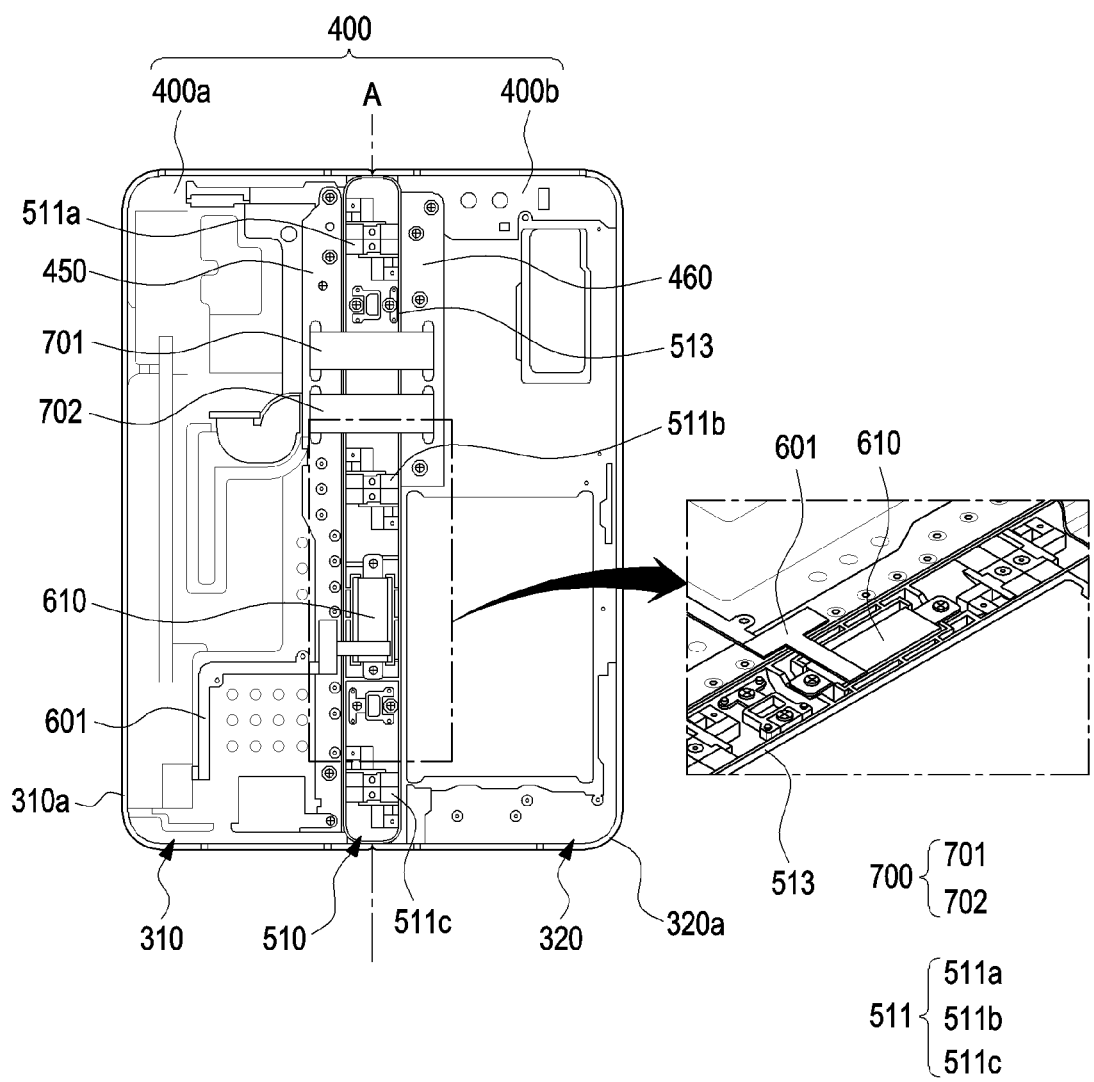
FIG. 8 is a view illustrating in detail a position at which the haptic actuator is mounted in the unfolded state of the foldable electronic device according to various embodiments of the disclosure.

FIG. 7 is an exploded perspective view illustrating an arrangement relationship of a haptic actuator and peripheral components thereof, According to various embodiments of the disclosure. FIG. 8 is a view illustrating in detail a position at which the haptic actuator is mounted in the unfolded state of the foldable electronic device According to various embodiments of the disclosure.

According to various embodiments, the foldable electronic device (hereinafter, an electronic device 101) may include a first housing structure 310, a second housing structure 320, a hinge structure 510, and a haptic actuator 610. The hinge structure 510 may include a hinge case 513 and a plurality of hinges 511. The first housing structure 310 may include a first housing 312, and a first bracket 400a at least partially covered by the first housing 312 and rotatably coupled to one side of the hinge structure 510. The second housing structure 320 may include a second housing 322, and a second bracket 400b at least partially covered by the second housing 322 and rotatably coupled to the other side of the hinge structure 510.

Some or all of the configurations of the first housing structure 310, the second housing structure 320, the hinge structure 510, and the haptic actuator 610 in FIGS. 7 and 8 may be the same as those of the first housing structure 310, the second housing structure 320, the hinge structure 510, and the haptic actuator 610 in FIG. 2 to FIG. 6A.

According to various embodiments, a plurality of hinges 511 are arranged inside the hinge case 513 and connecting plates 450 and 460 and a bridge circuit board 700 may be arranged on one surface of the bracket assembly 400. The bracket assembly 400 may include a first bracket 400a and a second bracket 400b, and a hinge case 513 may be arranged between the first bracket 400a and the second bracket 400b. The connecting plates 450 and 460 may include a first connecting plate 450 connected to the first bracket 400a, and a second connecting plate 460 connected to the second bracket 400b, and the bridge circuit board 700 may be arranged on one surfaces of the plates 450 and 460.

According to various embodiments, the first bracket 400a may be connected to the plurality of hinges 511 by the first connecting plate 450. The bridge circuit board 700 extending from the connecting plates 450 and 460 to one side may be arranged on a first surface 411 of the first bracket 400a. According to certain embodiments, the second bracket 400b may be connected to the plurality of hinges 511 by the second connecting plate 460. The bridge circuit board 700 extending from the connecting plates 450 and 460 to the other side may be arranged on the first surface 421 of the second bracket 400b.

According to various embodiments, the first bracket 400a and the second bracket 400b may be connected to each other to be foldable relative to each other by the plurality of hinges 511 and the connecting plates 450 and 460. When the electronic device 101 is in the folded state, the first surface 411 of the first bracket 400a and the first surface 421 of the second bracket 400b may face each other. When the electronic device 101 is in the unfolded state, the first surface 411 of the first bracket 400a and the first surface 421 of the second bracket 400b may face the same direction.

According to various embodiments, the electronic device 101 may include a plurality of hinges 511 which may be arranged inside the hinge case 513. One or more hinges 511 may be arranged in the Y-axis direction. The plurality of hinges 511 may be fixed inside the hinge case 513 and may be arranged in an area corresponding to a folding area (e.g., the folding area 203 in FIGS. 2 and 3) of the flexible display (e.g., the display 200 in FIGS. 2 and 3). One or more bridge circuit boards 700 may be arranged between the plurality of hinges 511. The plurality of hinges 511 may be connected to the bracket assembly 400 by the connecting plates 450 and 460, and the first bracket 400a and the second bracket 400b may be folded by the plurality of hinges 511.

According to various embodiments, a first guide hole 451 and a third guide hole 453 may be provided in the first connecting plate 450. A second guide hole 461 and a fourth guide hole 463 may be provided in the second connecting plate 460. At least a portion of the bridge circuit board 700 may be inserted into the guide holes 451, 453, 461, and 463 to partially guide the movement of the bridge circuit board 700 when the electronic device 101 is folded. For example, at least a portion of a first bridge circuit board 701 may be inserted into the first guide hole 451 provided in the first connecting plate 450 and the second guide hole 461 provided in the second connecting plate 460. At least a portion of a second bridge circuit board 702 may be inserted into the third guide hole 453 provided in the first connecting plate 450 and the fourth guide hole 463 provided in the second connecting plate 460.

According to various embodiments, the bridge circuit board 700 may be arranged in a direction (e.g., the X-axis direction) perpendicular to the folding axis A (e.g., the Y-axis direction). The bridge circuit board 700 may extend across the first bracket 400a and the second bracket 400b arranged on opposite sides of the plurality of hinges 511. The bridge circuit board 700 may be made of a flexible conductive material so that damage due to the folding of the electronic device can be prevented. In various embodiments, the extension direction of the bridge circuit board 700 is not necessarily limited to a direction perpendicular to the folding axis A.

According to various embodiments, the bridge circuit board 700 may include a first bridge circuit board 701 and a second bridge circuit board 702. At least a portion of the first bridge circuit board 701 may be exposed to the first surface 411 of the first bracket 400a and the first surface 421 of the second bracket 400b through the first guide hole 451 and the second guide hole 461. Similarly, at least a portion of the second bridge circuit board 702 may be exposed to the first surface 411 of the first bracket 400a and the first surface 421 of the second bracket 400b through the third guide hole 453 and the fourth guide hole 463.

According to various embodiments, the first bridge circuit board 701 and the second bridge circuit board 702 may be fixed to one surface of the bracket assembly 400. As described above, the first bridge circuit board 701 and the second bridge circuit board 702 may be primarily fixed by being inserted into the guide holes 451, 453, 461, and 463, and may be secondarily further fixed by a position-fixing structure provided on the bridge circuit board 700 and a position-fixing member provided on the bracket assembly 400.

According to various embodiments, the haptic actuator 610 may be arranged inside the hinge case 513. The haptic actuator 610 may be located such that the longitudinal direction thereof is oriented in the Y-axis and may provide a linear vibration movement along the Y-axis direction. According to another embodiment, the haptic actuator 610 may be arranged between the plurality of hinges 511. For example, when a first hinge 511a is located at the upper end of the hinge case 513, a second hinge 511b is located in the middle area of the hinge case 513, and a third hinge 511c is located at the lower end of the hinge case 513, the haptic actuator 610 may be arranged between the second hinge 511b and the third hinge 511c.

According to various embodiments, the haptic actuator 610 may be arranged in parallel with the folding axis A of the hinge structure 510. For example, the center line of the haptic actuator 610 may be arranged to overlap the folding axis A, thereby providing a linear vibration movement in parallel with the folding axis A. In general, vibrations generated by the haptic actuator arranged on one side of the first housing 312 (or the second housing 322) may be significantly attenuated by passing through the hinge structure while traveling to the second housing 322 (or the first housing 312). For this reason, a vibration force deviation between the housings occurs, and thus it is impossible to provide the same vibration force over the entire terminal. According to the disclosure, the haptic actuator 610 arranged inside the hinge structure 510 may provide a vibration force directly to the hinge structure 510, and the same vibration may be transferred from the hinge structure 510 toward the first housing 312 and the second housing 322 so that the same vibration can be provided to the entire terminal.

According to various embodiments, the haptic actuator 610 may be electrically connected to a printed circuit board (e.g., the board unit 520 in FIG. 4) by a flexible circuit board 601 connected to one side. For example, the flexible circuit board 601 may be arranged to extend from one end of the haptic actuator 610 to one end of the printed circuit board of the first housing 312 (or the second housing 322). As a result, the haptic actuator 610 may be operatively connected to a processor (e.g., the processor 120 in FIG. 1). The haptic actuator 610 may be controlled by the processor 120, and according to the control, a frequency, a signal strength, a signal phase, and/or whether to activate a signal may be adjusted. For example, the processor 120 may detect a folding state between the first housing 312 and the second housing 322 using at least one sensor and may control the haptic actuator 610 based at least in part on the sensed folding state.

According to various embodiments, the hinge case 513 may include a recess 515 having a size corresponding to that of the haptic actuator 610 such that the haptic actuator 610 is seated in and fixed to the recess 515. As another example, the haptic actuator 610 may include at least one hole into which a screw is inserted to fixedly couple the actuator 610 to the hinge case 513. However, the design of a configuration for fixing the haptic actuator 610 to the hinge case 513 may be variously changed.

According to various embodiments, the electronic device 101 may include a processor (e.g., the processor 120 in FIG. 1) and a memory (e.g., the memory 130 in FIG. 1). The processor 120 may execute software so as to control one or more different components (e.g., hardware or software components) of the electronic device 101, which are connected to the processor 120, and to perform various data processing or arithmetic operations. For example, the processor 120 may be arranged in the first housing structure 310 and/or the second housing structure 320 and may be operatively connected to the flexible display 200, at least one sensor, and the haptic actuator 610. The processor 120 may provide an instruction or data received from at least one of the flexible display 200, the at least one sensor, and the haptic actuator 610 to a volatile memory of the memory 130, may process the instruction or data stored in the volatile memory, and may store resultant data in a nonvolatile memory.

Figure 9:
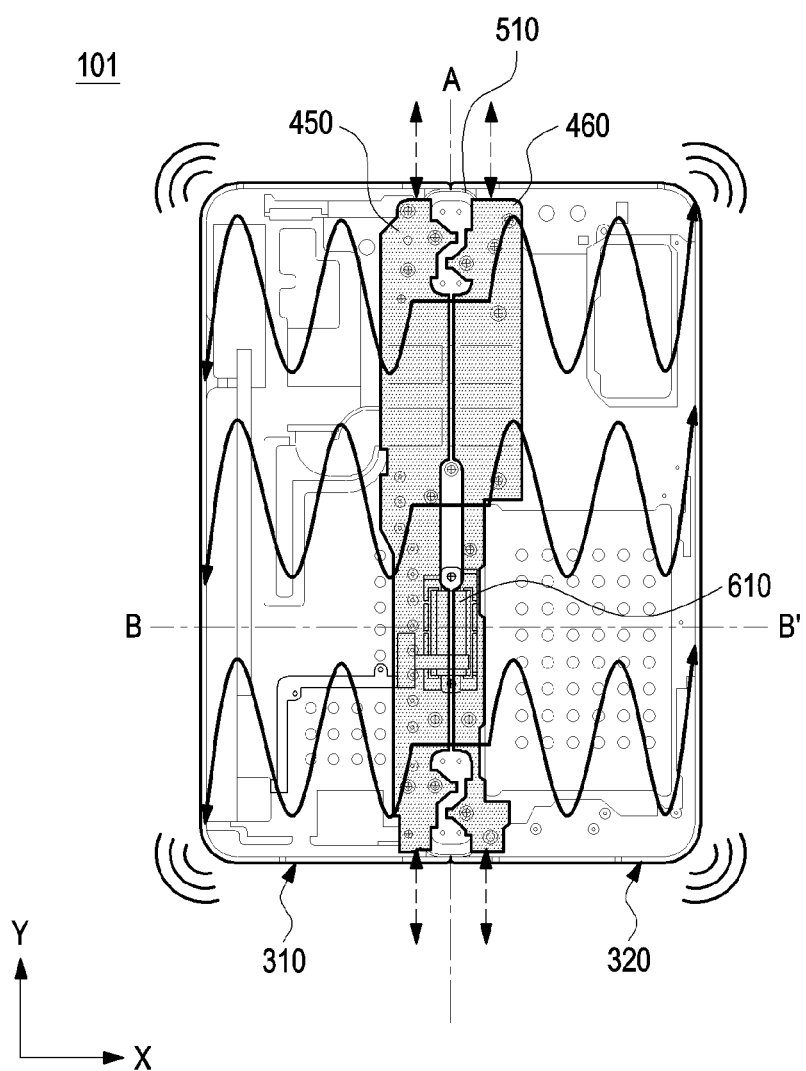
FIG. 9 is an internal schematic view schematically illustrating vibrations of a haptic actuator in the foldable electronic device in the unfolded state according to various embodiments of the disclosure.
Figure 10:
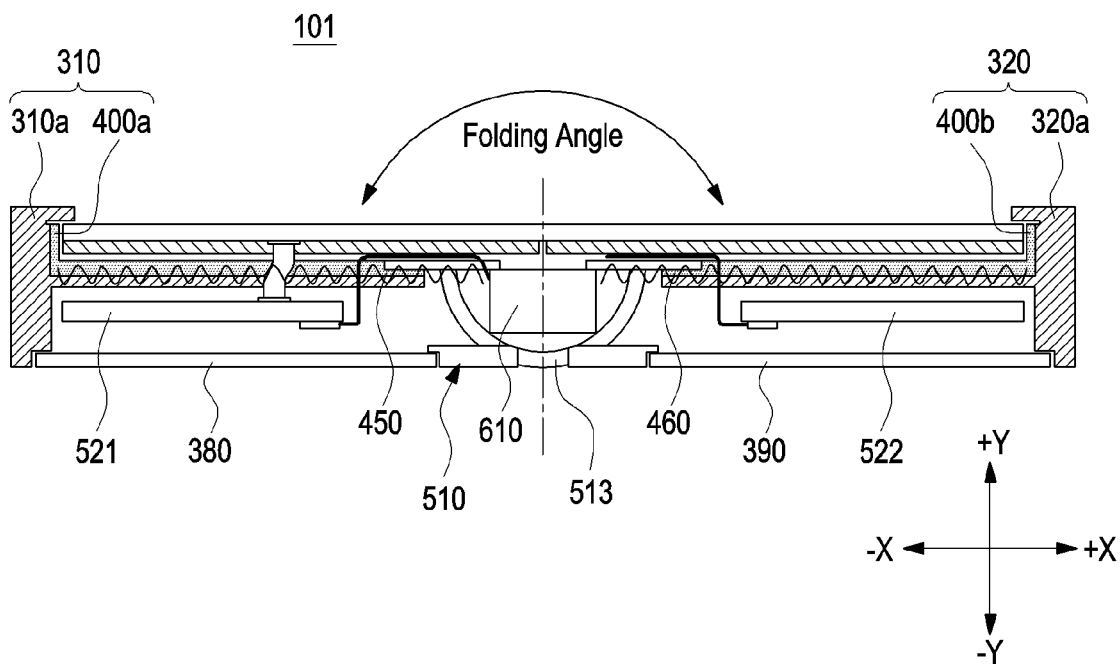
FIG. 10 is a cross-sectional view of the foldable electronic device of FIG. 9 taken in direction B-B'.

FIG. 9 is an internal schematic view schematically illustrating vibrations of a haptic actuator in the foldable electronic device in the unfolded state According to various embodiments of the disclosure. FIG. 10 is a cross-sectional view of the foldable electronic device of FIG. 9 taken in direction B-B'.

According to various embodiments, the foldable electronic device (hereinafter, an electronic device 101) may include a first housing structure 310, a second housing structure 320, connecting plates 450 and 460, a hinge structure 510, and at least one haptic actuator 610. As another example, the electronic device 101 may further include a flexible display 200, circuit boards 521 and 522, and rear covers 380 and 390. The first housing structure 310 may include a first housing 312 and a first bracket 400a, and the second housing structure 320 may include a second housing 322 and a second bracket 400b.

Some or all of the features related to the components illustrated in FIGS. 9 and 10 may be the same as those related to the components illustrated in FIGS. 2 to 8. Hereinafter, a path of vibrations generated by the haptic actuator 610 will be described.

According to various embodiments, the haptic actuator 610 may be arranged in the hinge case 513 and may vibrate in the axial direction (Y-axis direction) of the hinge case 513, which is the folding axis A, to transfer uniform vibration forces to the electronic device 101. For example, the vibrations generated by the haptic actuator 610 may be directly transferred to the hinge case 513, and the vibration forces transferred to the hinge case 513 may be transferred to the first connecting plate 450 and the second connecting plate 460 arranged on opposite sides of the hinge case 513. Since the vibration forces transferred to the first connecting plate 450 may be transferred to the first housing structure 310 (e.g., to the first housing 312 via the first bracket 400a), and the vibration forces transferred to the second connecting plate 460 may be transferred to the second housing structure 320 (e.g., to the second housing 322 via the second bracket 400b), it is possible to provide uniform vibration forces to the entire electronic device 101.

According to various embodiments, the haptic actuator 610 may be controlled by a processor (e.g., the processor 120 in FIG. 1), and according to the control, a frequency, a signal strength, a signal phase related to the vibrations and/or whether to activate a signal may be adjusted. According to certain embodiments, the vibrations generated by the haptic actuator 610 may travel in a first direction and may have an amplitude in a second direction perpendicular to the first direction. For example, the first direction may be the −X-axis direction in which the vibrations started from the haptic actuator 610 are directed toward the first housing 312, or the +X-axis direction in which the vibrations started from the haptic actuator 610 are directed toward the second housing 322. As another example, the second direction corresponds to the longitudinal direction of the haptic actuator 610 and may be the +Y-axis direction toward the upper end area of the electronic device or the −Y-axis direction toward the lower end area of the electronic device.

Figure 11A:
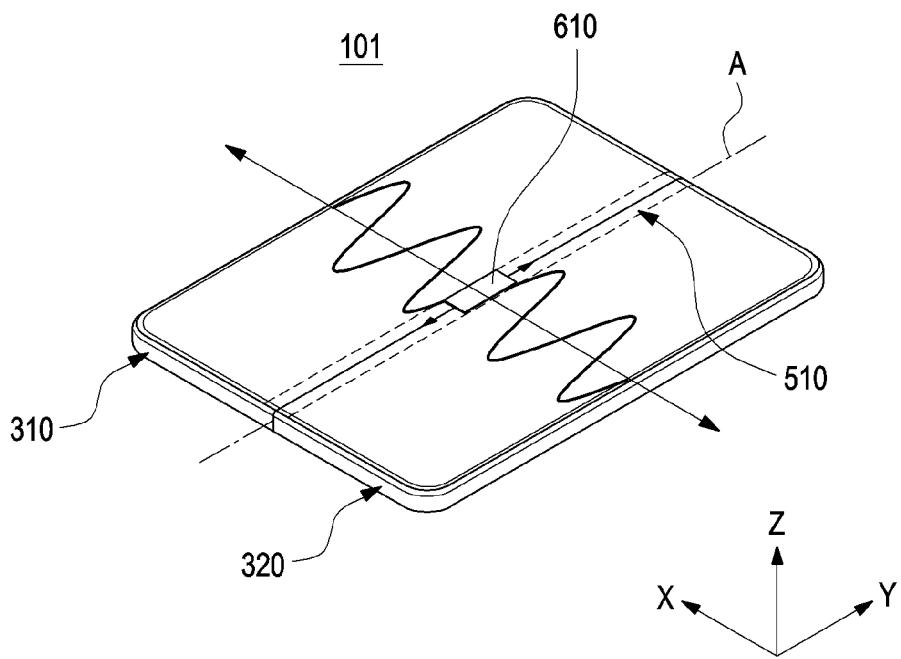
FIGS. 11A, 11B, and 11C are perspective views each schematically illustrating a vibration generated from a haptic actuator according to the folding operation of the foldable electronic device according to various embodiments of the disclosure.
Figure 11B:
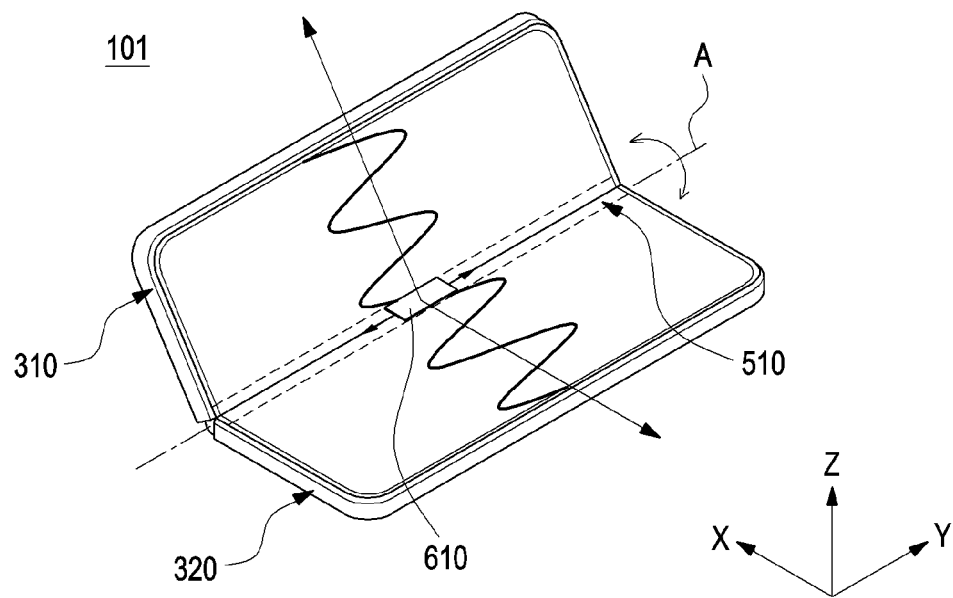
Figure 11C:
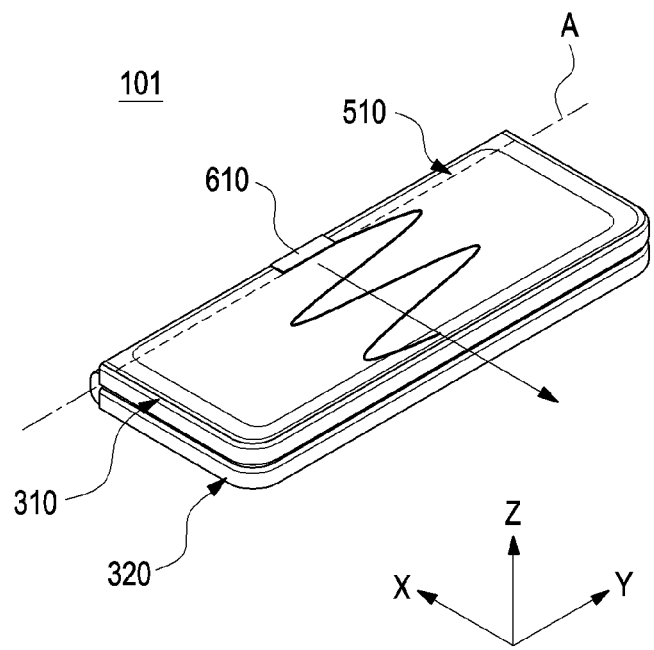
Figure 12A:
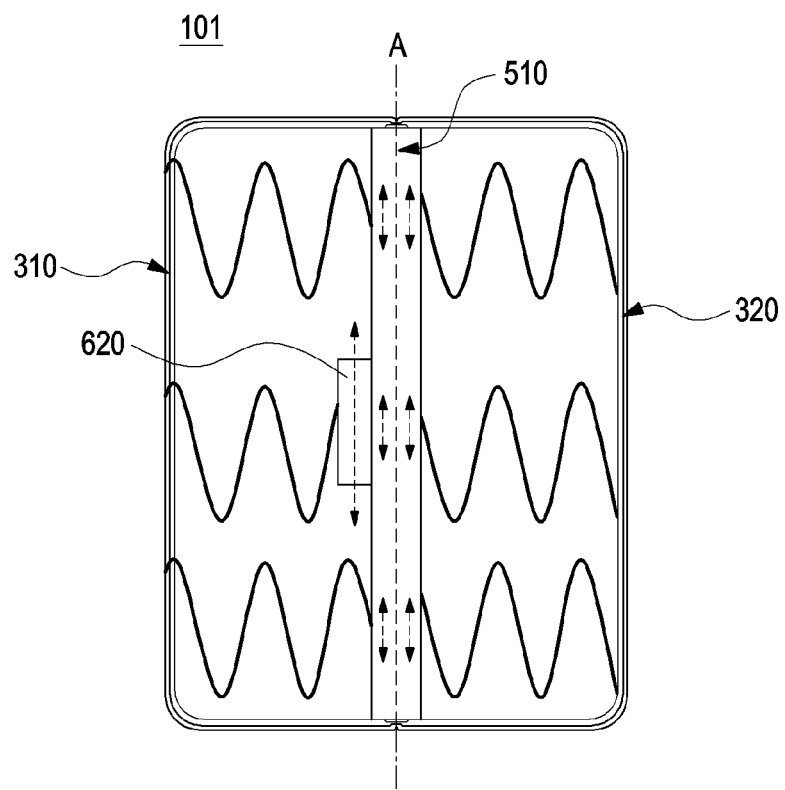
FIGS. 12A and 12B are perspective views schematically illustrating vibrations of a haptic actuator in the foldable electronic device in the unfolded state of the electronic device according to various embodiments of the disclosure.
Figure 12B:
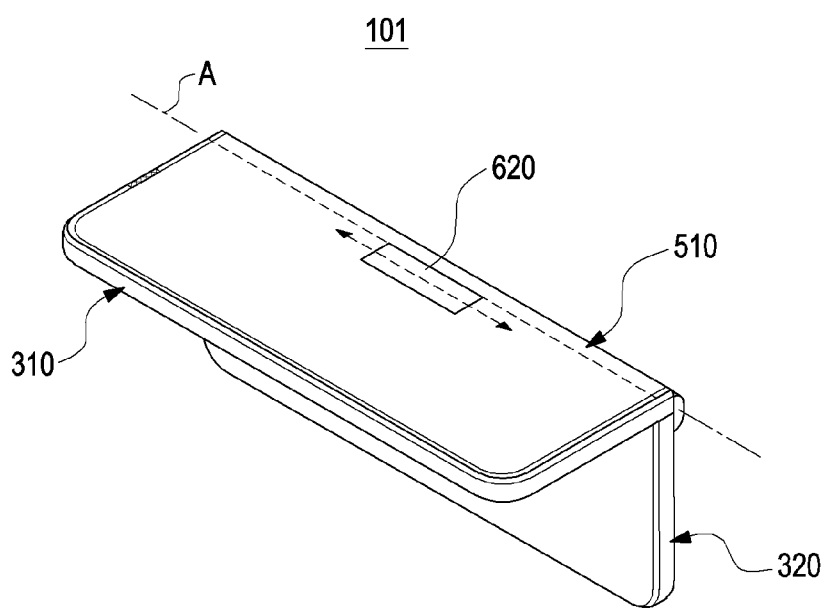

FIGS. 11A, 11B, and 11C are perspective views each schematically illustrating a vibration generated from a haptic actuator according to the folding operation of the foldable electronic device According to certain embodiments of the disclosure. FIGS. 12A and 12B are perspective views schematically illustrating vibrations of a haptic actuator in the foldable electronic device in the unfolded state and a partially folded state of the foldable electronic device according to another embodiment of the disclosure.

According to various embodiments, the foldable electronic device (hereinafter, an electronic device 101) may include a first housing structure 310, a second housing structure 320, a hinge structure 510, and a haptic actuator 610 or 620.

Some or all of the features related to the components illustrated in FIGS. 11A to 12B may be the same as those related to the components illustrated in FIGS. 2 to 6B. The electronic device of FIGS. 11A, 11B, and 11C has a structure related to FIG. 6A, and the electronic device of FIGS. 12A and 12B has a structure related to FIG. 6B.

According to various embodiments, the electronic device 101 may be configured such that the second housing structure 320 is rotatable relative to the first housing structure 310. As another example, the electronic device 101 may be configured such that the first housing structure 310 is rotatable relative to the second housing structure 320. Depending on the rotation operation, a folded state in which the first housing structure 310 and the second housing structure 320 face each other (see FIG. 6C), an unfolded state in which the first housing structure 310 and the second housing structure 320 are arranged side by side (see FIG. 6A), or an intermediate state maintaining a predetermined angle (see FIG. 6B) may be provided.

According to various embodiments, in the electronic device 101, the haptic actuator 610 or 620 may be arranged inside or adjacent to the hinge structure 510 and may uniformly transfer vibration forces generated in the folding angle A direction to the first housing structure 310 and the second housing structure 320.

Referring to FIGS. 11A, 11B, and 11C, the haptic actuator 610 of the electronic device 101 may be arranged in a direction parallel with the longitudinal direction of the hinge structure (e.g., the Y-axis direction), and may transfer equal vibration forces even in the folded state, the intermediate state, and/or the unfolded state in which the physical shape is changed. For example, the physical shape deformation along the folding angle A of the electronic device 101 may occur in a direction perpendicular to the longitudinal direction of the hinge structure 510, for example, with reference to the X and Z axes. Since the physical shape deformation is perpendicular to the vibration direction (the Y axis) (e.g., the amplitude direction) of the haptic actuator 610, the vibrations generated from the haptic actuator 610 regardless of the physical shape deformation may equally transfer vibration forces to the first housing structure 310 and the second housing structure 320 as a whole.

Referring to FIGS. 12A and 12B, in the electronic device 101, the haptic actuator 620 may be arranged on a structure adjacent to the hinge structure 510 and arranged in parallel with the folding axis A, so that the vibration forces generated in the folding axis A direction may be uniformly transferred to the first housing structure 310 and the second housing structure 320.

In general, when the electronic device is of an out-folding type (e.g., see FIG. 5B), the hinge structure 510 may include a multi-joint hinge, so that a mounting space inside the hinge structure 510 may be insufficient. According to an example of the disclosure, by arranging the haptic actuator 620 to be in contact with one side of the hinge structure 510, it is possible to transfer unattenuated vibration forces to the housing in which the haptic actuator 620 is not arranged. According to another embodiment, when a mounting space exists on one side (e.g., the lower end area) of the multi-joint hinge inside the hinge structure 510, the haptic actuator 620 may be arranged in the lower end area of the multi-joint hinge. In addition, the haptic actuator 620 may be arranged in a direction parallel to the longitudinal direction (e.g., the Y-axis direction) of the hinge structure 510 to transfer equal vibration forces even when the physical shape is changed.

An electronic device (e.g., the electronic device 101 in FIGS. 1 to 5) according to various embodiments of the disclosure may include a first housing structure (e.g., 310 of FIG. 7), a second housing structure (e.g., 320 in FIG. 7) arranged adjacent to the first housing structure, a hinge structure (e.g., 510 in FIG. 7) arranged between the first housing structure and the second housing structure and configured to provide a rotational movement between the first housing structure and the second housing structure, a flexible display (e.g., 200 FIG. 5) extending from the first housing structure across the hinge structure to the second housing structure, and at least one haptic actuator (e.g., 610 in FIG. 6A, 620 in FIG. 6B) arranged inside or adjacent to the hinge structure. The at least one haptic actuator may be arranged in parallel with a direction for a folding axis of the hinge structure so as to output vibrations corresponding to the folding axis.

According to various embodiments, the vibrations output by the at least one haptic actuator may travel in a first direction perpendicular to the folding axis and have an amplitude in a second direction parallel with the folding axis.

According to various embodiments, when the second housing structure is rotated relative to the first housing structure, the direction of the amplitude of the vibrations generated by the at least one haptic actuator may be perpendicular to a length of an edge of the first housing structure used for forming an angle.

According to various embodiments, the first housing structure (e.g., 310 in FIG. 7) may include a first housing (e.g., 310a in FIG. 7) a first bracket (e.g., 400a in FIG. 7) that is at least partially covered by a first housing (e.g., 310a in FIG. 7) and rotatably coupled to a first side of the hinge structure. The second housing structure (e.g., 320 in FIG. 7) may include a second housing (e.g., 320a in FIG. 7) a second bracket (e.g., 400a in FIG. 7) that is at least partially covered by a second housing (e.g., 320a in FIG. 7) and rotatably coupled to a second side of the hinge structure.

According to various embodiments, the hinge structure (e.g., 510 in FIG. 7) may include a plurality of hinges (e.g., 511 in FIG. 7) and a hinge case (e.g., 513 in FIG. 7) covering at least one surface for each of the plurality of hinges.

According to various embodiments, the electronic device may further include a connecting plate (e.g., connecting plates 450 and 460 of FIG. 7) including a first part (e.g., the first connecting plate 450 in FIG. 7) coupled to a first end of the hinge case and the first bracket and a second part (e.g., the second connecting plate 460 in FIG. 7) coupled to a second end of the hinge case and coupled to the second bracket.

According to various embodiments, the vibrations generated by the at least one haptic actuator may pass through the hinge case and the connecting plate and may move to the first housing structure and the second housing structure. A vibration transferred to the first housing structure and a vibration transferred to the second housing structure may be equal to each other in at least one of a frequency, a signal strength, and a signal phase.

According to various embodiments, a vibration transferred to the first part of the connecting plate may be transferred to the first bracket and then transferred to the first housing, and a vibration transferred to the second part of the connecting plate may be transferred to the second bracket and then transferred to the second housing.

According to various embodiments, the electronic device may further include a processor (e.g., 120 in FIG. 1) arranged in the first housing structure or the second housing structure and operatively connected to the flexible display and the at least one haptic actuator, and a memory (e.g., 130 in FIG. 1) operatively connected to the processor.

According to various embodiments, the processor is configured to control the at least one haptic actuator may adjust at least one of a frequency, a signal strength, a signal phase, and whether to activate a signal.

According to various embodiments, the electronic device may further include a flexible circuit board (e.g., 601 in FIG. 7) extending from a first end of the haptic actuator to a printed circuit board mounted in the first housing structure or the second housing structure to electrically connect the haptic actuator to the printed circuit board.

According to various embodiments, the haptic actuator arranged in the hinge case may be arranged between the plurality of hinges, and the center of the haptic actuator may be arranged to overlap the folding axis.

According to various embodiments, the hinge case may include a recess (e.g., 515 in FIG. 7) having a size corresponding to the haptic actuator to seat the haptic actuator therein. In order to be fixedly coupled to the hinge case, the haptic actuator may include at least one hole through which a coupling member is inserted.

According to various embodiments, in a folded state of the electronic device, the intensity and phase of vibrations of the haptic actuator may be the same as the intensity and phase of the vibrations of the haptic actuator in an unfolded state of the electronic device.

According to various embodiments, the at least one haptic actuator may be mounted inside the first housing structure or the second housing structure and may be arranged to be in contact with a side of the hinge structure.

An electronic device (e.g., the electronic device 101 in FIGS. 1 to 5) according to various embodiments of the disclosure may include a first housing structure, a second housing structure disposed adjacent to the first housing structure, a hinge structure arranged between the first housing structure and the second housing structure and configured to provide a rotational movement between the first housing structure and the second housing structure, and at least one haptic actuator arranged inside the hinge structure. The at least one haptic actuator may be arranged in parallel with a direction for a folding axis of the hinge structure so as to output an amplitude parallel with the folding axis.

According to various embodiments, the direction of vibrations generated by the at least one haptic actuator is perpendicular to the folding axis, and the vibrations may travel from opposite ends of the at least one haptic actuator toward the first housing structure and the second housing structure, respectively.

According to various embodiments, the electronic device may further include a connecting plate including a first part coupled to a first end of the hinge structure and the first housing structure, and a second part coupled to a second end of the hinge structure and the second housing structure.

According to various embodiments, the vibrations generated by the at least one haptic actuator may pass through the hinge structure and the connecting plate and may move to the first housing structure and the second housing structure. A vibration transferred to the first housing structure and a vibration transferred to the second housing structure may be equal to each other in at least one of a frequency, a signal strength, and a signal phase.

According to various embodiments, the haptic actuator arranged inside the hinge structure may be arranged between the plurality of hinges, and the center line of the haptic actuator may be arranged to overlap the folding axis.

It may be apparent to a person ordinarily skilled in the technical field to which the disclosure belongs that an electronic device including a haptic actuator according to various embodiments of the disclosure is not limited by the above-described embodiments and drawings, and can be variously substituted, modified, and changed within the technical scope of the disclosure.

What is claimed is:

1. An electronic device comprising:
   a first housing structure;
   a second housing structure disposed adjacent to the first housing structure;
   a hinge structure disposed between the first housing structure and the second housing structure and configured to provide a rotational movement between the first housing structure and the second housing structure;
   a flexible display extending from the first housing structure across the hinge structure to the second housing structure; and
   at least one haptic actuator disposed inside or adjacent to the hinge structure,
   wherein the at least one haptic actuator is disposed in parallel with a direction for a folding axis of the hinge structure to output a vibration corresponding to the folding axis, wherein the vibration output by the at least one haptic actuator travels in a first direction perpendicular to the folding axis and has an amplitude in a second direction parallel with the folding axis, wherein the first housing structure includes a first housing, and a first bracket that is at least partially covered by the first housing and rotatably coupled to a first side of the hinge structure, wherein the second housing structure includes a second housing, and a second bracket that is at least partially covered by the second housing and rotatably coupled to a second side of the hinge structure, wherein the hinge structure includes a plurality of hinges, and a hinge case covering at least one surface for each of the plurality of hinges, wherein the electronic device further comprises a connecting plate including a first part coupled to a first end of the hinge case and the first bracket, and a second part coupled to a second end of the hinge case and the second bracket, and wherein the vibration generated by the at least one haptic actuator pass through the hinge case and the connecting plate, the vibration is generated to move to the first housing structure and the second housing structure, and the vibration transferred to the first housing structure and the second housing structure is at least one of a frequency, a signal strength, and a signal phase.

2. The electronic device of claim 1, wherein, when the second housing structure is rotated relative to the first housing structure, a direction of an amplitude of the vibration generated by the at least one haptic actuator is perpendicular to a length of a side of the first housing structure used for forming an angle.

3. The electronic device of claim 1, wherein:
a vibration transferred to the first part of the connecting plate is transferred to the first bracket and then transferred to the first housing, and
a vibration transferred to the second part of the connecting plate is transferred to the second bracket and then transferred to the second housing.

4. The electronic device of claim 1, further comprising:
a processor disposed in the first housing structure or the second housing structure and operatively connected to the flexible display and the at least one haptic actuator; and
a memory operatively connected to the processor.

5. The electronic device of claim 4, wherein the processor is configured to control the at least one haptic actuator to adjust at least one of a frequency, a signal strength, a signal phase, and whether to activate a signal.

6. The electronic device of claim 1, further comprising:
a flexible circuit board extending from a first end of the haptic actuator to a printed circuit board mounted in the first housing structure or the second housing structure to electrically connect the haptic actuator to the printed circuit board.

7. The electronic device of claim 1, wherein:
the haptic actuator disposed in the hinge case is disposed between the plurality of hinges, and
a center of the haptic actuator is disposed to overlap the folding axis.

8. The electronic device of claim 1, wherein:
the hinge case includes a recess of a size corresponding to that of the haptic actuator to seat the haptic actuator therein, and the haptic actuator includes at least one hole through which a coupling member is inserted, in order to be fixedly coupled to the hinge case.

9. The electronic device of claim 8, an intensity and a phase of vibrations of the haptic actuator in a folded state of the electronic device are equal to an intensity and a phase of vibrations of the haptic actuator in an unfolded state of the electronic device.

10. The electronic device of claim 1, wherein the at least one haptic actuator is mounted inside the first housing structure or the second housing structure and disposed to be in contact with a side of the hinge structure.

11. An electronic device comprising:
a first housing structure;
a second housing structure disposed adjacent to the first housing structure;
a hinge structure disposed between the first housing structure and the second housing structure and configured to provide a rotational movement between the first housing structure and the second housing structure; and
at least one haptic actuator disposed inside the hinge structure,
wherein the at least one haptic actuator is disposed in parallel with a direction for a folding axis of the hinge structure to output an amplitude parallel with the folding axis,
wherein a vibration output by the at least one haptic actuator travels in a first direction perpendicular to the folding axis and has the amplitude in a second direction parallel with the folding axis,
wherein the first housing structure includes a first housing, and a first bracket that is at least partially covered by the first housing and rotatably coupled to a first side of the hinge structure,
wherein the second housing structure includes a second housing, and a second bracket that is at least partially covered by the second housing and rotatably coupled to a second side of the hinge structure,
wherein the hinge structure includes a plurality of hinges, and a hinge case covering at least one surface for each of the plurality of hinges,
wherein the electronic device further comprises a connecting plate including a first part coupled to a first end of the hinge case and the first bracket, and a second part coupled to a second end of the hinge case and the second bracket, and
wherein the vibration generated by the at least one haptic actuator pass through the hinge case and the connecting plate, the vibration is generated to move to the first housing structure and the second housing structure, and the vibration transferred to the first housing structure and the second housing structure is at least one of a frequency, a signal strength, and a signal phase.

12. The electronic device of claim 11, wherein the vibration travels from opposite ends of the at least one haptic actuator toward the first housing structure and the second housing structure, respectively.

13. The electronic device of claim 11, wherein:
the haptic actuator disposed in the hinge structure is disposed between a plurality of hinges, and
a center line of the haptic actuator is disposed to overlap the folding axis.

* * * * *